United States Patent
Lemmers, Jr. et al.

(10) Patent No.: US 11,028,780 B2
(45) Date of Patent: Jun. 8, 2021

(54) HYDRAULIC UNIT GEAR SHROUDS

(71) Applicant: Hamilton Sundstrand Corporation, Charlotte, NC (US)

(72) Inventors: Glenn C. Lemmers, Jr., Loves Park, IL (US); Derek R. Hochstetler, Rockford, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 69 days.

(21) Appl. No.: 16/355,198

(22) Filed: Mar. 15, 2019

(65) Prior Publication Data

US 2020/0291863 A1 Sep. 17, 2020

(51) Int. Cl.
*F02C 7/32* (2006.01)
*F02C 7/36* (2006.01)

(52) U.S. Cl.
CPC .............. *F02C 7/32* (2013.01); *F02C 7/36* (2013.01); *F05D 2260/40311* (2013.01)

(58) Field of Classification Search
CPC ............. F16H 57/0409; F16H 57/0423; F16H 57/0421; F02C 7/32
See application file for complete search history.

(56) References Cited

U.S. PATENT DOCUMENTS

| | | | |
|---|---|---|---|
| 3,788,426 A | 1/1974 | Hull, Jr. | |
| 9,879,773 B2 | 1/2018 | Slayter et al. | |
| 9,989,143 B2 | 6/2018 | Fomison | |
| 2012/0238396 A1* | 9/2012 | Weber | F16H 57/0423 475/230 |
| 2014/0260790 A1 | 9/2014 | Passino et al. | |
| 2016/0138476 A1* | 5/2016 | Lemarchand | F01D 25/162 415/213.1 |
| 2016/0290396 A1 | 10/2016 | Lemmers, Jr. et al. | |
| 2017/0146112 A1 | 5/2017 | Anglin et al. | |
| 2020/0291864 A1* | 9/2020 | Lemmers, Jr. | F16H 57/0424 |

FOREIGN PATENT DOCUMENTS

JP 2015/089748 A 5/2015

OTHER PUBLICATIONS

Extended European Search Report dated Mar. 16, 2020, issued during the prosecution of European Patent Application No. EP 19216329.3.

* cited by examiner

*Primary Examiner* — Richard W Ridley
*Assistant Examiner* — Brian J McGovern
(74) *Attorney, Agent, or Firm* — Locke Lord LLP; Joshua L. Jones; Scott D. Wofsy

(57) ABSTRACT

A gear shroud arrangement includes a plate defining an aperture therethrough. A riser tube has a first end and an opposed second end. The first end of the riser tube is connected to the plate and is aligned with the aperture. A mounting flange extends from the second end of the riser tube. A shroud member extends from the plate in a direction opposite the riser tube.

14 Claims, 5 Drawing Sheets

HYDRAULIC UNIT GEAR SHROUDS

BACKGROUND OF THE INVENTION

1. Field of the Invention

The present disclosure relates to gear shrouds, and more particularly to gear shrouds for gears integrated drive generators (IDGs).

2. Description of Related Art

Generators are connected to gas turbine engines so that aircraft can generate on board electricity. In order to produce useful power, generators need to be driven at a substantially constant speed. To drive a generator at a constant speed using a gas turbine engine that runs at very different speeds at different stages in a flight, a constant speed drive (CSD) can be connected between the gas turbine engine and the generator. A CSD is a type of transmission that reduces the range of speed at its input to a much narrower range of speed at its output to provide a nearly constant output speed over a range of input speeds. A CSD and generator can be integrated together into a single unit called an Integrated Drive Generator (IDG).

The conventional techniques have been considered satisfactory for their intended purpose. However, there is an ever present need for improved CSDs and IDGs. This disclosure provides a solution for this need.

SUMMARY OF THE INVENTION

A gear shroud arrangement includes a plate defining an aperture therethrough. A riser tube has a first end and an opposed second end. The first end of the riser tube is connected to the plate and is aligned with the aperture. A mounting flange extends from the second end of the riser tube. A shroud member extends from the plate in a direction opposite the riser tube.

The shroud member can include a first shroud segment circumferentially crossing a 12 o'clock position on the plate as viewed looking toward the mounting flange, a second shroud segment circumferentially between the 12 o'clock position and a 3 o'clock position relative to the 12 o'clock position, and a third shroud segment circumferentially between the 3 o'clock position and a 6 o'clock position relative to the 12 o'clock position. The second and third shroud segments can be convex relative to the riser tube, and a concave web can connect between the second and third shroud segments. The concave web can define a notch therein.

The plate can define a registration feature for registering the plate with an IDG housing, wherein the registration feature includes a radiused section extending from a 6 o'clock position to a 9 o'clock position relative to the 12 o'clock position. The registration feature can include a first flat land extending tangent to the radiused section from the 9 o'clock position, terminating in an end that is perpendicular to the first flat land. The registration feature can include a second flat land extending tangent to the radiused section from the 6 o'clock position, terminating at an end that is perpendicular to the second flat land.

An IDG housing can be included wherein the registration feature is engaged to an outer housing wall of the IDG housing. The mounting flange can define a plurality of fastener apertures therethrough. A hydraulic transmission unit can be mounted to the mounting flange by fasteners engaged in the fastener apertures. The hydraulic transmission unit can be a first hydraulic transmission unit, and an opposed gear shroud for a second hydraulic transmission unit can extend parallel to the first hydraulic transmission unit. The plate can define a concavity between the 12 o'clock position and the 3 o'clock position for accommodating a differential gear meshing with hydraulics transmission gear shrouded by the shroud member. The opposed gear shroud can engage a concave web in the plate. The riser tube can define an aperture therethrough extending in a circumferential portion of the riser tube from a position between an 11 o'clock position and the 12 o'clock position, and a position between 2 o'clock and 3 o'clock relative to the 12 o'clock position. A differential shroud can extend within the aperture.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
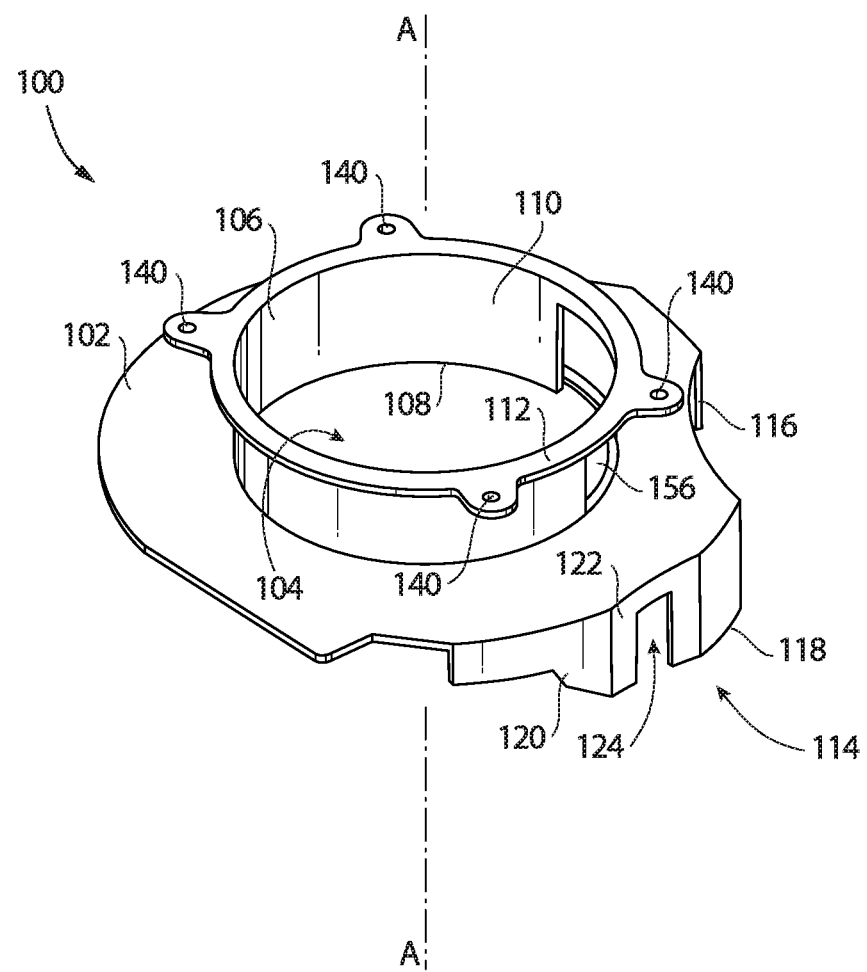
FIG. 1 is a perspective view of an exemplary embodiment of a gear shroud constructed in accordance with the present disclosure, showing the plate with the riser tube and shroud member extending therefrom.

Reference will now be made to the drawings wherein like reference numerals identify similar structural features or aspects of the subject disclosure. For purposes of explanation and illustration, and not limitation, a partial view of an exemplary embodiment of a gear shroud arrangement in accordance with the disclosure is shown in FIG. 1 and is designated generally by reference character 100. Other embodiments of gear shrouds in accordance with the disclosure, or aspects thereof, are provided in FIGS. 2-6, as will be described. The systems and methods described herein can be used to shroud gears in IDGs to reduce the amount of oil churning, which improves IDG efficiency and scavenge pump performance, thus improving the IDG oil servicing range.

A gear shroud arrangement 100 includes a plate 102 defining an aperture 104 therethrough. A riser tube 106 has a first end 108 and an opposed second end 110. The first end 108 of the riser tube is connected to the plate 102 and is aligned with the aperture 104 along the axis A. A mounting flange 112 extends from the second end 110 of the riser tube 106. A shroud member 114 extends from the plate 102 in a direction opposite the riser tube 106, i.e. the riser tube 106 extends upwards as oriented in FIG. 1, and the shroud member 114 extends downwards. The shroud member 114 includes a first shroud segment 116, a second shroud segment 118, and a third shroud segment 120.

Figure 2:
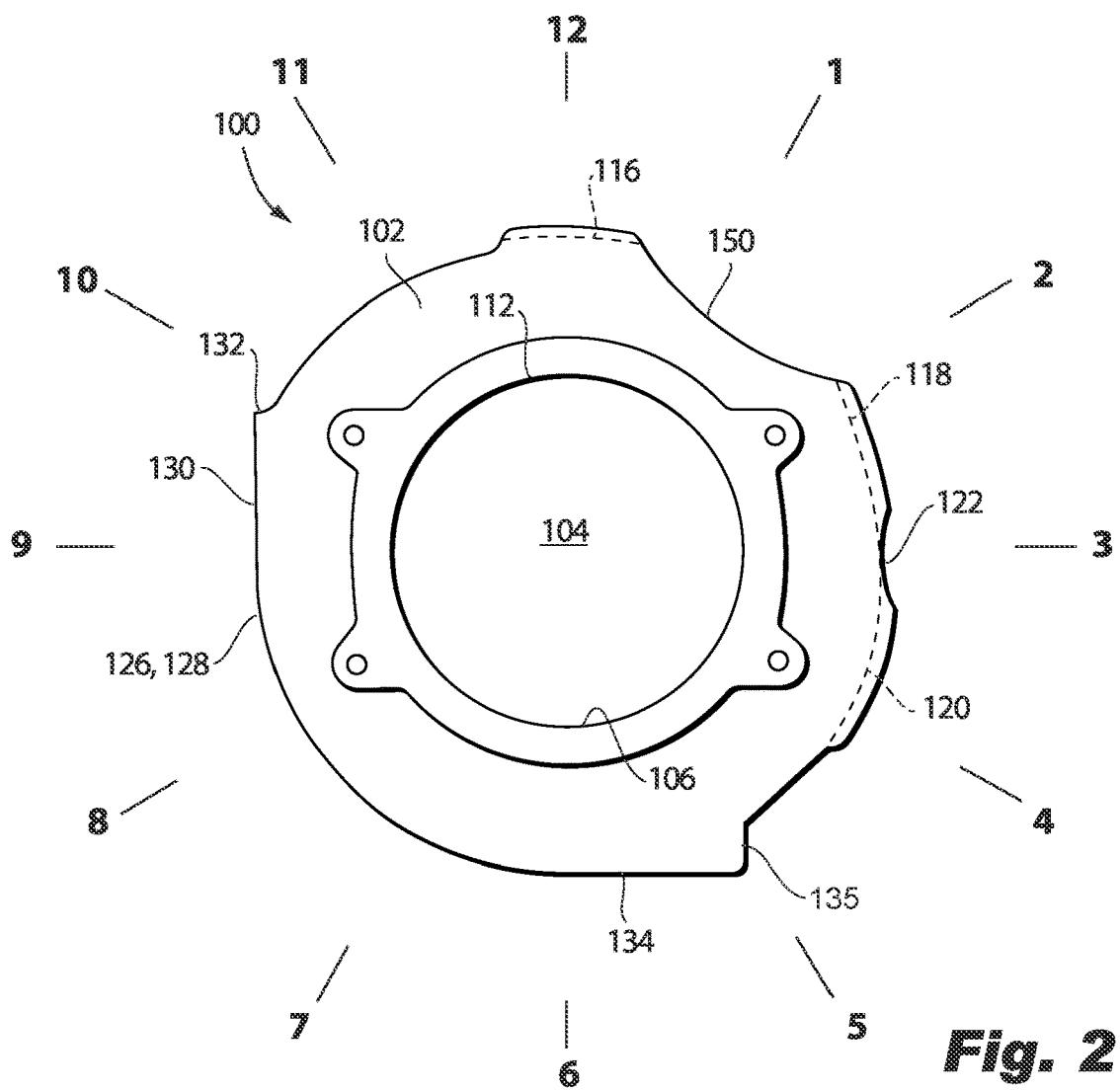
FIG. 2 is a plan view of the gear shroud of FIG. 1, showing the registration feature.

With reference now to FIG. 2, the first shroud segment 116 circumferentially crosses a 12 o'clock position on the plate 102 as viewed looking toward the mounting flange 112. The second shroud segment 118 is located circumferentially between the 12 o'clock position and a 3 o'clock position relative to the 12 o'clock position. The third shroud segment 120 is located circumferentially between the 3 o'clock position and a 6 o'clock position relative to the 12 o'clock position. The second and third shroud segments 118 and 120 are convex relative to the riser tube 106. A concave web 122 connects between the second and third shroud segments 118 and 120. The concave web 122 defines a notch 124 therein, as shown in FIG. 1.

The plate 102 defines a registration feature 126 for registering the plate 102 with an idg housing. The registration feature 126 includes a radiused section 128 extending from the 6 o'clock position to a 9 o'clock position relative to the 12 o'clock position. The registration feature 126 includes a first flat land 130 extending tangent to the radiused section 128 from the 9 o'clock position, terminating in an end 132 that is perpendicular to the first flat land 130. The registration feature 126 includes a second flat land 134 extending tangent to the radiused section 128 from the 6 o'clock position, terminating at an end 135 that is perpendicular to the second flat land 134.

Figure 3:
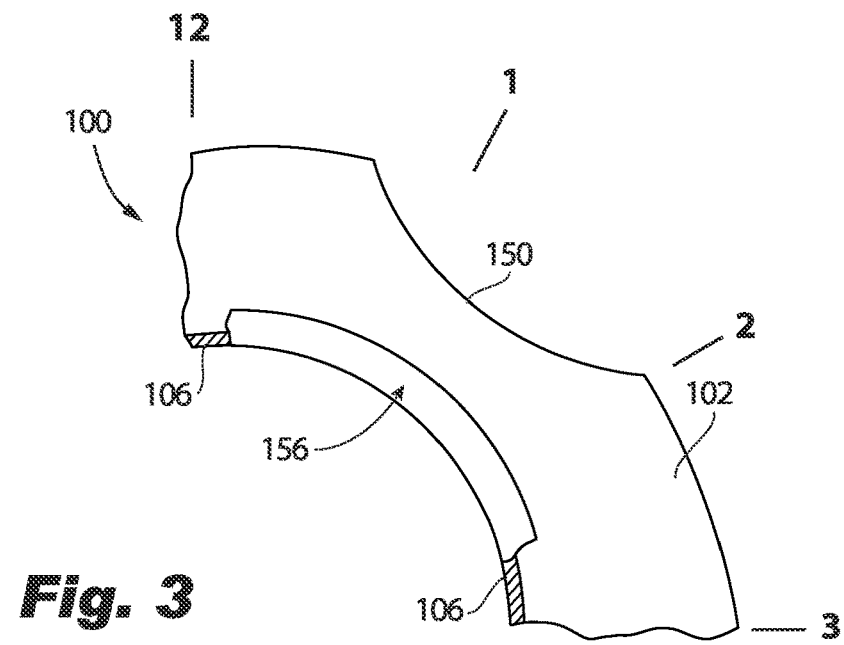
FIG. 3 is a cross-sectional plan view of a portion of the gear shroud of FIG. 2, showing the aperture through the riser tube.
Figure 4:
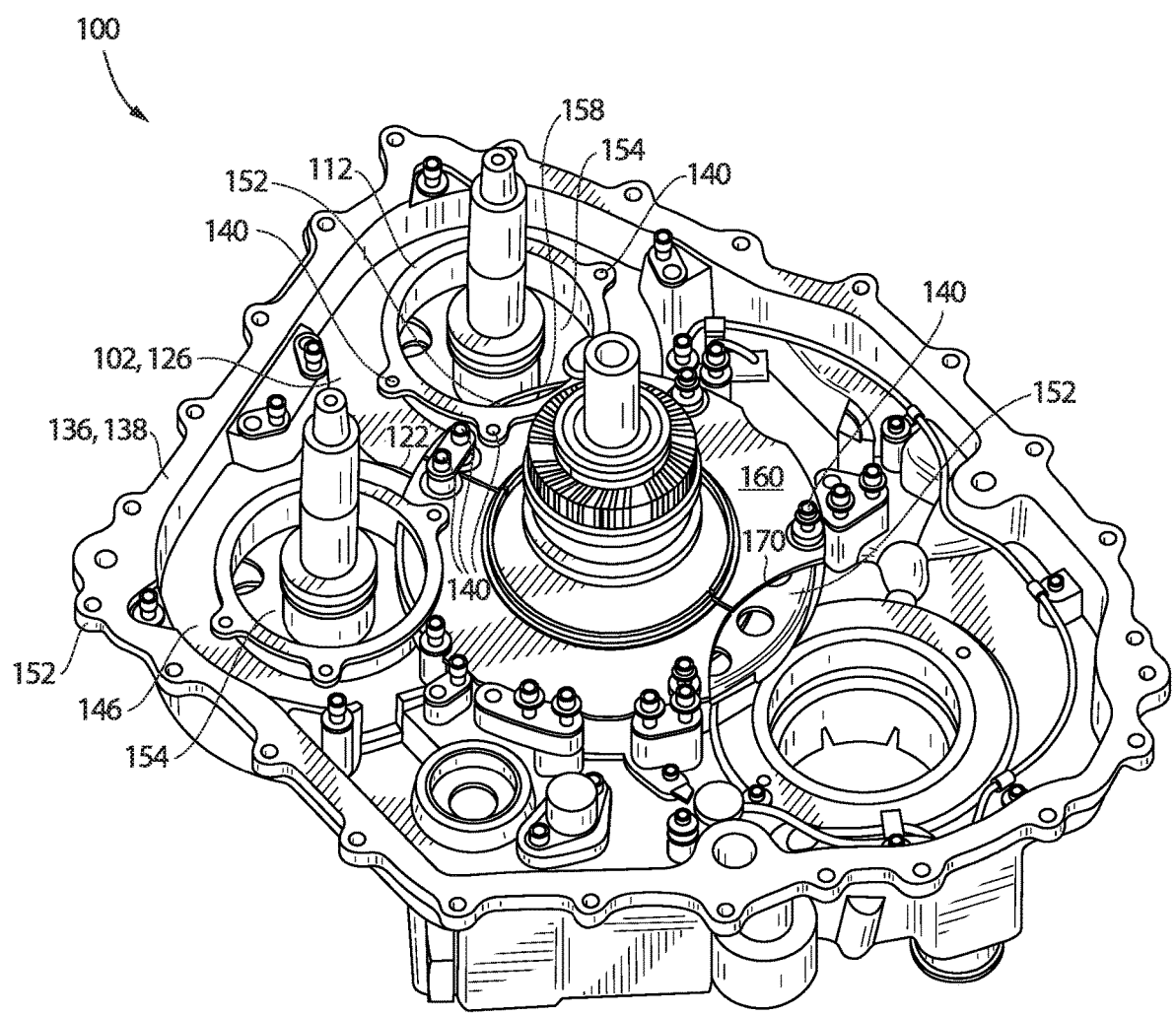
FIG. 4 is a perspective view of the gear shroud of FIG. 1, showing the registration feature engaged with the outer wall of an integrated drive generator (IDG) housing.
Figure 5:
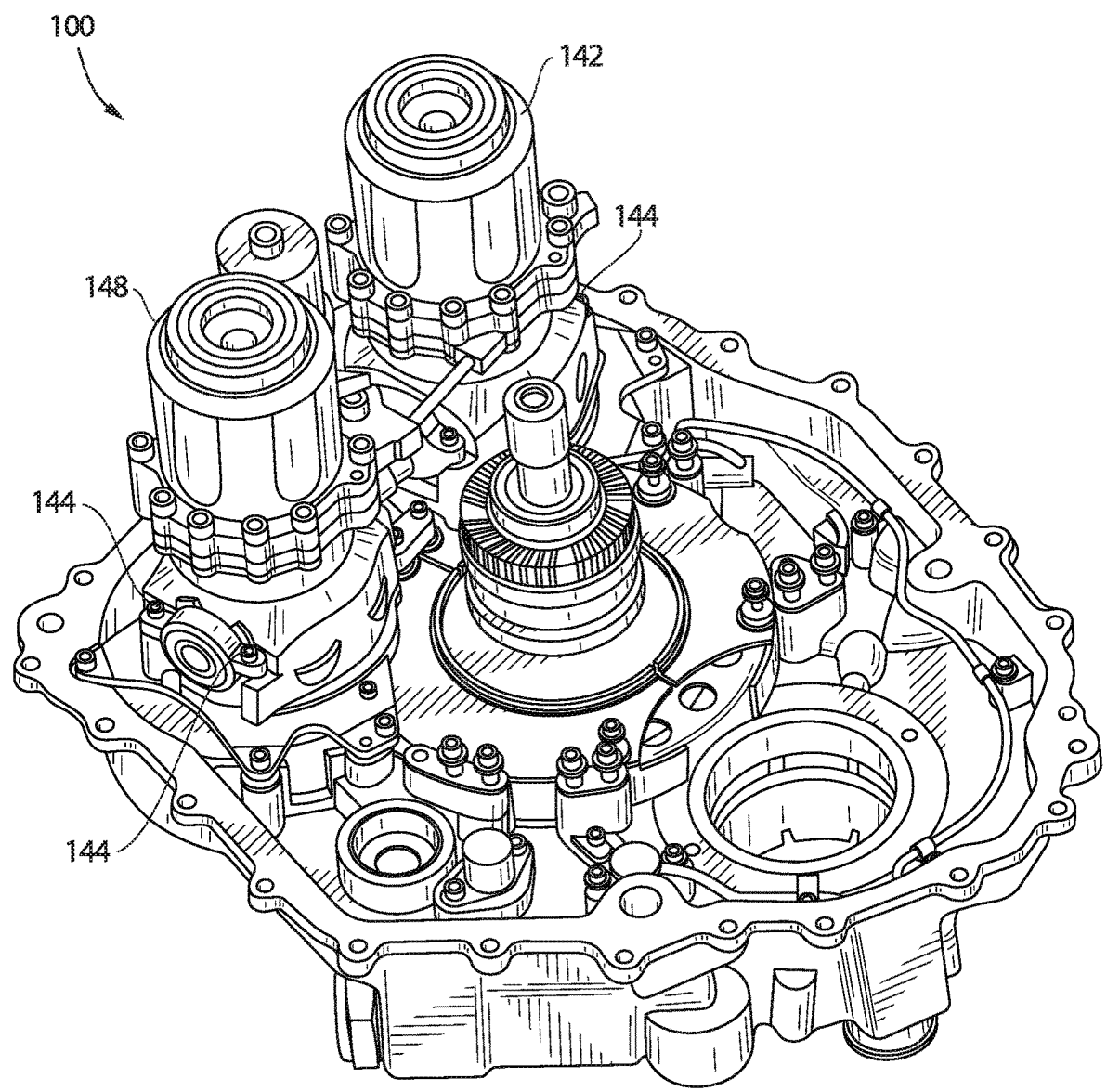
FIG. 5 is a perspective view of the gear shroud arrangement of FIG. 4, showing two hydraulic transmission units and a differential unit engaged in the IDG housing.
Figure 6:
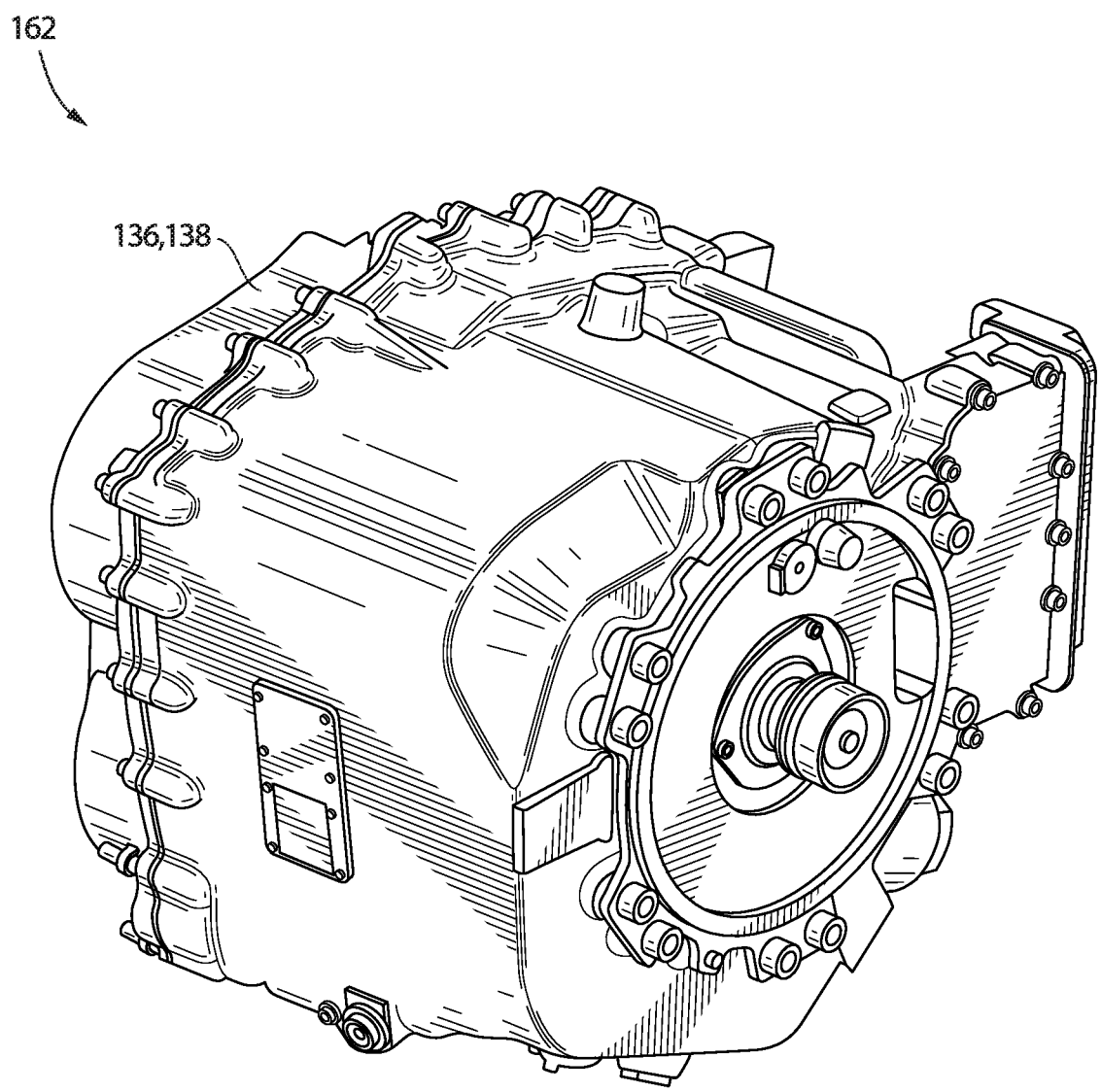
FIG. 6 is a perspective view of the IDG housing of FIG. 5.

An IDG housing 136 is included wherein the registration feature 126 is engaged to an outer housing wall 138 of the IDG housing 136. The mounting flange 112 defines a plurality of fastener apertures 140 therethrough. A hydraulic transmission unit 142, shown in FIG. 5, is mounted to the mounting flange 112 by fasteners 144 engaged in the fastener apertures 140. An opposed gear shroud 146, shown in FIG. 4, is included for a second hydraulic transmission unit 148, shown in FIG. 5, which extends parallel to the first hydraulic transmission unit 142. The plate 102 defines a concavity 150, identified in FIG. 2, between the 12 o'clock position and the 3 o'clock position for accommodating a differential gear 152, identified in FIG. 4, meshing with a hydraulics transmission gear 154 shrouded by the shroud member 114 shown in FIG. 1. The opposed gear shroud 146, shown in FIG. 4, engages the concave web 122 in the plate 102 shown in FIG. 1. The riser tube 106, shown in FIG. 1, defines an aperture 156 therethrough. As shown in FIG. 3, the aperture 156 extends in a circumferential portion of the riser tube 106 from a position between an 11 o'clock position and the 12 o'clock position, and a position between 2 o'clock and 3 o'clock relative to the 12 o'clock position. As shown in FIG. 4, a portion 158 of a differential shroud 160 extends within the aperture 156. As shown in FIG. 6, when fully assembled, the outer housing wall 138 of the IDG housing 136 surrounds the components shown in FIGS. 4-5 and forms an IDG 162.

The methods and systems of the present disclosure, as described above and shown in the drawings, provide for gear shrouds with superior properties including reducing the amount of oil churning, which improves IDG efficiency and scavenge pump performance, thus improving the IDG oil servicing range. While the apparatus and methods of the subject disclosure have been shown and described with reference to preferred embodiments, those skilled in the art will readily appreciate that changes and/or modifications may be made thereto without departing from the scope of the subject disclosure.

What is claimed is:
1. A gear shroud arrangement comprising:
   a plate defining an aperture therethrough;
   a riser tube having a first end and an opposed second end, wherein the first end of the riser tube is connected to the plate and is aligned with the aperture;
   a mounting flange extends from the second end of the riser tube; and
   a shroud member extending from the plate in a direction opposite the riser tube, wherein the shroud member includes:
      a first shroud segment circumferentially crossing a 12 o'clock position on the plate as viewed looking toward the mounting flange;
      a second shroud segment circumferentially between the 12 o'clock position and a 3 o'clock position relative to the 12 o'clock position; and
      a third shroud segment circumferentially between the 3 o'clock position and a 6 o'clock position relative to the 12 o'clock position, wherein the second and third shroud segments are convex relative to the riser tube, and wherein a concave web connects between the second and third shroud segments, wherein concave is relative to an axis parallel to the center axis of the riser tube and convex is relative to the axis parallel to the center axis of the riser tube.

2. The arrangement as recited in claim 1, wherein the concave web defines a notch therein.

3. The arrangement as recited in claim 1, wherein the riser tube defines an aperture therethrough extending in a circumferential portion of the riser tube from a position between:
   an 11 o'clock position and the 12 o'clock position; and
   a position between a 2 o'clock position and the 3 o'clock position relative to the 12 o'clock position.

4. The arrangement as recited in claim 1, wherein the plate defines a concavity between the 12 o'clock position and the 3 o'clock position for accommodating a differential gear meshing with hydraulics transmission gear shrouded by the shroud member.

5. The arrangement as recited in claim 1, wherein the plate defines a registration feature for registering the plate with an integrated drive generator (IDG) housing, wherein the registration feature includes a radiused section extending from the 6 o'clock position to a 9 o'clock position relative to the 12 o'clock position.

6. The arrangement as recited in claim 5, wherein the registration feature includes a first flat land extending tangent to the radiused section from the 9 o'clock position, terminating in an end that is perpendicular to the first flat land.

7. A gear shroud arrangement comprising:
   a plate defining an aperture therethrough;
   a riser tube having a first end and an opposed second end, wherein the first end of the riser tube is connected to the plate and is aligned with the aperture;
   a mounting flange extends from the second end of the riser tube; and
   a shroud member extending from the plate in a direction opposite the riser tube;

wherein the shroud member includes:
    a first shroud segment circumferentially crossing a 12 o'clock position on the plate as viewed looking toward the mounting flange;
    a second shroud segment circumferentially between the 12 o'clock position and a 3 o'clock position relative to the 12 o'clock position; and
    a third shroud segment circumferentially between the 3 o'clock position and a 6 o'clock position relative to the 12 o'clock position;
wherein the plate defines a registration feature for registering the plate with an integrated drive generator (IDG) housing, wherein the registration feature includes a radiused section extending from the 6 o'clock position to a 9 o'clock position relative to the 12 o'clock position;
wherein the registration feature includes a first flat land extending tangent to the radiused section from the 9 o'clock position, terminating in an end that is perpendicular to the first flat land;
wherein the registration feature includes a second flat land extending tangent to the radiused section from the 6 o'clock position, terminating at an end that is perpendicular to the second flat land.

8. The arrangement as recited in claim 7, further comprising an integrated drive generator (IDG) housing, wherein the registration feature is engaged to an outer housing wall of the IDG housing.

9. The arrangement as recited in claim 8, wherein the mounting flange defines a plurality of fastener apertures therethrough, and further comprising a hydraulic transmission unit mounted to the mounting flange by fasteners engaged in the fastener apertures.

10. The arrangement as recited in claim 9, wherein the hydraulic transmission unit is a first hydraulic transmission unit and further comprising an opposed gear shroud for a second hydraulic transmission unit extending parallel to the first hydraulic transmission unit, wherein the opposed gear shroud engages a concave web in the plate.

11. The arrangement as recited in claim 10, wherein the riser tube defines an aperture therethrough extending in a circumferential portion of the riser tube from a position between:
    an 11 o'clock position and the 12 o'clock position; and
    a position between a 2 o'clock position and the 3 o'clock position relative to the 12 o'clock position, and wherein a differential shroud extends within the aperture.

12. The arrangement as recited in claim 7, wherein the concave web defines a notch therein.

13. The arrangement as recited in claim 7, wherein the riser tube defines an aperture therethrough extending in a circumferential portion of the riser tube from a position between:
    an 11 o'clock position and the 12 o'clock position; and
    a position between a 2 o'clock position and the 3 o'clock position relative to the 12 o'clock position.

14. The arrangement as recited in claim 7, wherein the plate defines a concavity between the 12 o'clock position and the 3 o'clock position for accommodating a differential gear meshing with hydraulics transmission gear shrouded by the shroud member.

* * * * *